2,928,719

PREPARATION OF METAL BOROHYDRIDES FROM SODIUM BOROHYDRIDE

Robert G. Berner, New Providence, and William G. Marancik, Cranford, N.J., assignors to Callery Chemical Company, Pittsburgh, Pa., a corporation of Pennsylvania No Drawing. Application March 18, 1954
Serial No. 417,236

7 Claims. (Cl. 23—14)

This invention relates to a new and improved method for the preparation of metal borohydrides and more particularly to a new and improved method for preparing metal borohydrides in substantial yield from sodium borohydride by a two-step metathesis.

In recent years considerable investigation has been made of metal borohydrides in general and the alkali and alkaline earth metal borohydrides in particular because of their importance as selective reducing agents for both organic and inorganic compounds and also as intermediates in the preparation of diborane ($B_2H_6$). This class of compounds is relatively new, in fact the first such compound was reported in 1939 by Schlesinger and his co-workers. The first borohydride to be prepared was lithium borohydride ($LiBH_4$) which was prepared by the action of diborane on lithium ethyl. Since that time other methods have been developed for preparing other metal borohydrides. Most of these methods involve the reaction of diborane with a metal hydride or a metal organic compound. It is apparent that processes such as these which require the use of diborane as a reactant in preparing metal borohydrides are both expensive and circuitous. Recently methods have been developed for preparing certain metal borohydrides which do not involve the use of diborane. These methods however are restricted to the preparation of a very few compounds. It has been found that sodium borohydride and lithium borohydride may be made by the reaction of their metal hydrides with methyl borate. However, this reaction has not proved satisfactory for the preparation of other metal borohydrides. Inasmuch as sodium borohydride is the most readily available of all the borohydrides it is apparent that a process for preparing other metal borohydrides from sodium borohydride would be very desirable.

It is therefore one of the objects of this invention to provide a new and improved method for the preparation of metal borohydrides from sodium borohydride in substantial yield and utilizing relatively inexpensive reactants.

Another object of this invention is to provide a new and improved method for the preparation of metal borohydrides from sodium borohydride in substantial yield by a two-step metathetic reaction.

Other objects will become apparent from time to time throughout the specification and claims as hereinafter related.

The new and improved process which comprises this invention will be described more fully hereinafter and the novelty thereof will be particularly pointed out and distinctly claimed.

We have found that it is possible to make metal borohydrides which cannot be made by direct processes or which require the use of diborane in their manufacture by a two-step metathetic reaction using sodium borohydride ($NaBH_4$) as a starting reactant. Metathetic reactions are well known in chemistry and generally are defined as a reaction involving an exchange of elements or ions or radicals between two chemical reactants. A direct or one-step metathetic reaction is one in which two chemical compounds are mixed and an exchange reaction takes place. Such a metathetic reaction is possible only when the products of the reaction are separable by differential solubility or differential volatility. In some cases a simple one-step or direct metathetic reaction is not feasible due to unfavorable solubilities or volatilities of the basic starting reactants. In such a case a two-step metathetic reaction may be used. In a two-step metathetic reaction a salt of the desired acid radical is dissolved in a suitable solvent. The solution thus formed is then treated with a strong acid which liberates the acid of the dissolved salt and precipitates the salt of the strong acid. In a two-step metathetic reaction any acid is considered to be a strong acid which will replace the acid ion of the dissolved salt. The weak acid which is thus released is then neutralized by treatment with a base of the desired metal ion or is reacted with the desired metal itself if said metal is of a degree of activity such that it is capable of replacing hydrogen. This reaction will therefore yield the desired salt and a by-product of reaction. In cases where one or more of the reactants, intermediates, or products are not stable in water or where an anhydrous product is desired a non-aqueous solvent, such as liquid ammonia or a lower organic amine, may be used. In a process of this type, the salt of the desired acid radical and the strong acid which are used in the first step of the process must both be soluble in the particular solvent used. The salt which is formed in the first step of this reaction and the weak acid which is liberated must be separable, preferably by precipitation of the salt. In the second step of the reaction the base or metal which is reacted with the weak acid should be at least slightly soluble in the solvent.

The application of the two-step metathesis principle to the preparation of borohydrides would involve the dissolving of a metal borohydride in a suitable solvent. This solution would then be treated with a strong acid to release "hydroboric" acid ($HBH_4$) and precipitate the metal salt of the strong acid. The "hydroboric" acid ($HBH_4$) would then be reacted with a base of the desired metal ion or reacted with the metal itself if the metal were capable of replacing hydrogen from the acid. This reaction as just described however cannot be carried out inasmuch as "hydroboric" acid ($HBH_4$) is not a stable compound and has never been identified. This reaction, however, can be carried out in a solvent which is capable of forming a stable "addition" compound with "hydroboric" acid. The term addition compound as used herein is intended to cover such compounds as ammonium salts, which compounds can be considered as addition compounds of ammonia and an acid. An ammonium or substituted ammonium salt when dissolved in liquid ammonia or in an amine functions as a solution of the corresponding acid in that solvent. Ammonium borohydride ($NH_4BH_4$) is a stable compound as a solid and in solution in liquid ammonia at very low temperatures (below −20° C.) Substituted ammonium borohydrides such as methylammonium borohydride and ethylammonium borohydride are stable solids at temperatures up to 0° C. and are stable in solution at the boiling point of the amines from which these compounds are formed. Secondary and tertiary ammonium borohydrides are stable in solution at even higher temperatures. It is apparent therefore that ammonium borohydride or substituted ammonium borohydrides could be made in the parent amine of the compound and could be replaced with a suitable metal or could be neutralized with a base such as a metal amide, imide, or nitride, soluble in the particular solvent used to produce the desired metal borohydride by this process.

In this invention a metal borohydride is dissolved in a non-aqueous solvent capable of forming a stable compound with hydroboric acid ($HBH_4$) and a strong acid reacted therewith to release the hydroboric acid and precipitate the metal salt of the strong acid. The solution of hydroboric acid is then reacted with a metal capable of replacing hydrogen or a base of the desired metal to produce the desired metal borohydride.

In one experiment a solution was made containing 1.90 g. of sodium borohydride in 50 ml. of methylamine. A second solution was made containing 3.87 g. of methylammonium chloride in 50 ml. of methylamine (methylammonium chloride is a strong acid when dissolved in methylamine). These solutions were mixed in a glass reactor at a temperature just below the boiling point of methylamine (−6° C.). In the reaction which resulted upon mixing these two solutions sodium chloride was formed as a precipitate and methylammonium borohydride ($CH_3NH_3BH_4$) was formed as a soluble salt which remained in solution in the methylamine. The mixture was agitated for 15 minutes to insure complete precipitation of the sodium chloride and the solution was filtered to remove the precipitate. The precipitate was washed with methylamine to recover any methylammonium chloride which had been retained by the sodium chloride. To the solution of methylammonium borohydride there was added 2.3 grams of potassium metal which dissolved in the methylamine. The dissolved potassium metal reacted immediately with the methylammonium borohydride to precipitate potassium borohydride, evolve hydrogen, and form an additional amount of methylamine as a product of reaction. The mixture was agitated for two hours to insure complete reaction of the potassium and complete precipitation of the potassium borohydride. The precipitate was filtered from the solution and was purified by leaching out the potassium borohydride with ammonia. On evaporation, a product weighing 2.1 grams and containing 97% potassium borohydride was formed. Potassium borohydride may be precipitated from this solution in the same way by reaction with potassium amide or potassium methylamide, which reaction is a neutralization reaction rather than a replacement reaction such as took place with the potassium metal.

In another experiment a solution of sodium borohydride was made in ethylamine. This solution was reacted with a solution of ethylammonium chloride in ethylamine and sodium chloride precipitated therefrom leaving ethylammonium borohydride in solution. Calcium borohydride was prepared from this solution of ethylammonium borohydride by adding calcium metal to the solution and allowing a simple replacement reaction to take place. As in the case of potassium borohydride this same reaction will take place with the appropriate metal amide to produce any desired metal borohydride. In the case of calcium borohydride it is necessary to cool the solution to cause the calcium borohydride to precipitate. The calcium borohydride can also be made to precipitate by adding ammonia to the solution of calcium borohydride in ethylamine.

In carrying out the foregoing reactions the strong acid solution may be made by dissolving the ammonium salt (or alkylammonium salt) in the ammonia (or amine) or may be generated in situ by dissolving the appropriate acid in the solvent. It was found that ammonium salts made by dissolving HCl, $H_2S$, HF and $H_2SO_4$ in ammonia (or amine) all function satisfactorily in liberating hydroboric acid upon reaction with a sodium borohydride solution.

It should be noted that this invention can be carried out by dissolving a metal borohydride, such as sodium borohydride, in a solvent which is capable of forming a stable compound with hydroboric acid ($HBH_4$), which solvent may be ammonia or an organic amine. The solution of sodium borohydride is then reacted with a suitable strong acid to precipitate a sodium salt and leaving an addition compound of hydroboric acid in the solution. This solution may then be reacted with a metal capable of replacing hydrogen or with a base having the desired metal ion. As previously stated the reaction is preferably carried out in liquid ammonia or in one of the organic amines and when carried out in the manner described is capable of producing any desired metal borohydride, provided that the metal meets the other requirements as to solubility or degree of activity previously set forth.

Having thus described our invention in compliance with the patent laws, what we desire to claim and secure by Letters Patent of the United States is:

1. A method of preparing potassium borohydride which comprises dissolving sodium borohydride in methylamine, reacting the resultant solution with methylammonium chloride to release methylammonium borohydride and precipitate sodium chloride from the solution, separating the precipitated sodium chloride from the solution, reacting the methylammonium borohydride solution with potassium metal, and separating the potassium borohydride precipitated by the last named reaction.

2. A method of preparing calcium borohydride which comprises dissolving sodium borohydride in ethylamine, reacting the resulting solution with ethylammonium chloride to release ethylammonium borohydride and precipitate sodium chloride, separating the sodium chloride from said solution, and reacting said ethylammonium borohydride solution with calcium metal to produce calcium borohydride and separating the calcium borohydride formed by the last named reaction.

3. A method of preparing a metal borohydride of the group consisting of alkali metal borohydrides other than sodium borohydride and alkaline earth metal borohydrides which comprises contacting sodium borohydride with an acid selected from the group consisting of hydrogen halides, hydrogen sulfide and sulfuric acid in a solvent selected from the group consisting of ammonia and lower alkyl amines to produce an addition compound of hydroboric acid and said solvent, reacting said addition compound with a member free from sodium and selected from the group consisting of alkali and alkaline earth metals and amides of alkali and alkaline earth metals, and recovering the resulting metal borohydride thus formed.

4. A method in accordance with claim 3 in which said member free from sodium reacted with said addition compound is an alkali metal.

5. A method in accordance with claim 3 in which said member reacted with said addition compound is an alkaline earth metal.

6. A method of preparing alkali metal borohydrides which comprises dissolving sodium borohydride in a lower alkyl amine, reacting with the solution thus formed a solution of an acid selected from the group consisting of hydrogen halides, hydrogen sulfide and sulfuric acid in a lower alkyl amine to release an alkylammonium borohydride and precipitate a sodium salt of said acid, reacting said alkylammonium borohydride solution with a sodium-free alkali metal and separating the resulting alkali metal borohydride thus formed.

7. A method of preparing alkaline earth metal borohydride which comprises dissolving sodium borohydride in a lower alkyl amine, reacting with the solution thus formed a solution of an acid selected from the group consisting of hydrogen halides, hydrogen sulfide and sulfuric acid in a lower alkyl amine to release an alkylammonium borohydride and precipitate a sodium salt of said acid, reacting said alkylammonium borohydride solution with an alkaline earth metal and separating the resulting alkaline earth metal borohydride thus formed.

References Cited in the file of this patent

UNITED STATES PATENTS 2,741,540   Bragdon et al. _____ Apr. 10, 1956

OTHER REFERENCES

Schechter et al.: Boron Hydrides and Related Compounds, pages 47 and 59. Published by Dept. of the Navy, Bureau of Aeronautics, as a restricted paper January 8, 1951. Declassified January 5, 1954.